United States Patent
Thibodeau

[15] 3,703,216
[45] Nov. 21, 1972

[54] TRACTOR DRIVE CONVERSION
[72] Inventor: John L. Thibodeau, Tampa, Fla.
[73] Assignee: Standard Alliance Industries, Inc., Chicago, Ill.
[22] Filed: June 30, 1971
[21] Appl. No.: 158,359

Related U.S. Application Data
[62] Division of Ser. No. 811,728, April 1, 1969, Pat. No. 3,620,321.

[52] U.S. Cl..................180/44 R, 180/41, 180/24.02
[51] Int. Cl. ................................................B60k 17/30
[58] Field of Search.......180/41, 45, 49, 23, 24, 44 R

[56] References Cited
UNITED STATES PATENTS
3,351,037  11/1967  Meili.........................180/24 X FOREIGN PATENTS OR APPLICATIONS
770,667   3/1957   Great Britain................180/45
852,617   10/1960  Great Britain................180/41
174,279   2/1961   Sweden ........................180/41

Primary Examiner—Kenneth H. Betts
Attorney—James P. Hume et al.

[57] ABSTRACT

There is disclosed a means to convert a conventional two wheel drive tractor to four wheel drive utilizing the original tractor power unit, the transmission-differential and the frame comprising two walking beam frame assemblies connected to the original rear drive axle, each housing a sprocket for a front wheel, a sprocket for a rear wheel, a means to drive these wheels, and a chain to take the power from the drive means and transfer it to the wheel sprockets. The drive sprocket is connected to the tractor rear axle transmission-differential on each side of the tractor so that the power from the tractor is transmitted to the front and rear wheel sprockets by the continuous chain. A ball joint is added to each wheel which is connected to the wheel sprocket in the frame, a hydraulic cylinder is connected to each ball joint with a steering arm allowing the wheel to be steered hydraulically. A vertical hydraulic cylinder is connected to a yoke which extends over the hood of the tractor allowing the power unit to be raised or lowered hydraulically without affecting the plane of the four wheels of the tractor and acting as an oscillator on the front wheels.

10 Claims, 13 Drawing Figures

Inventor
John L. Thibodeau

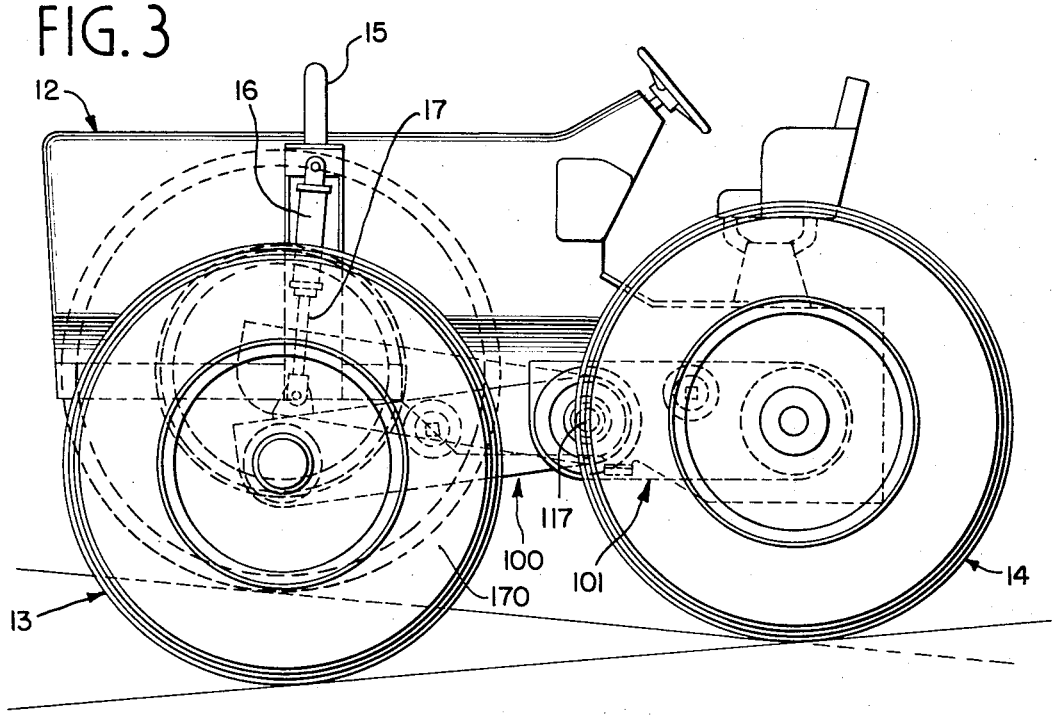
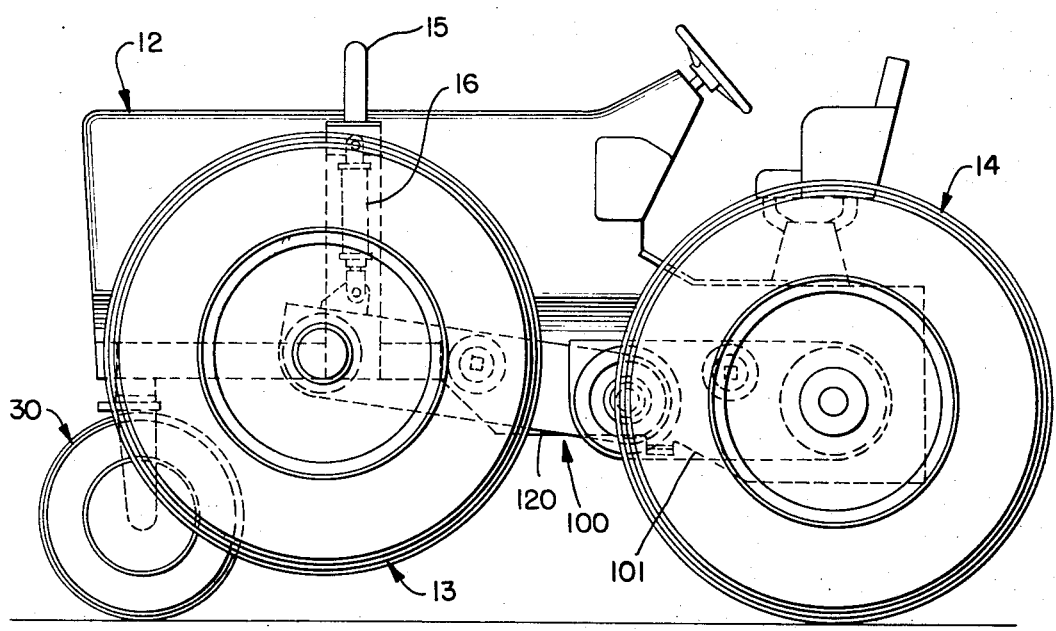

Inventor
John L. Thibodeau

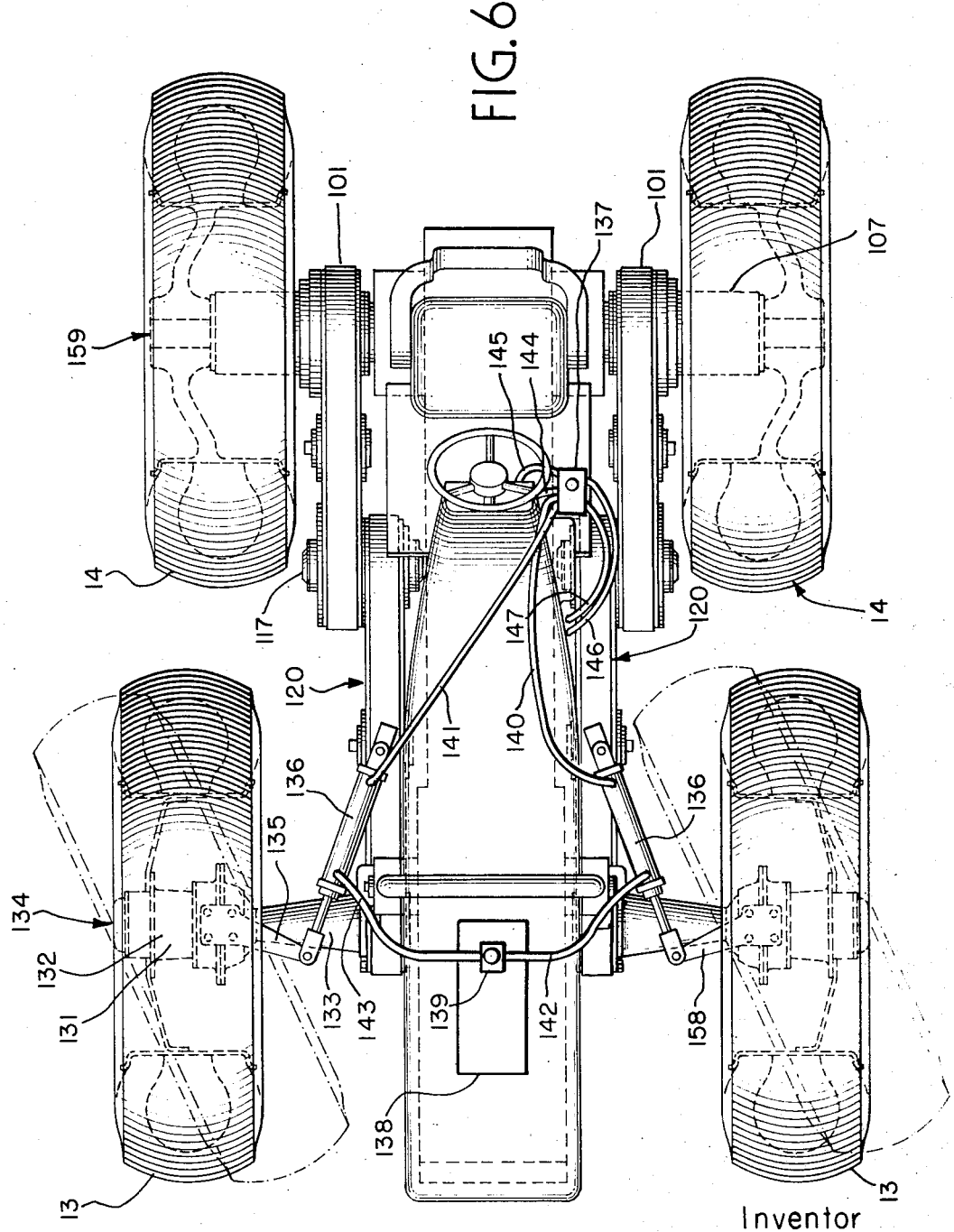

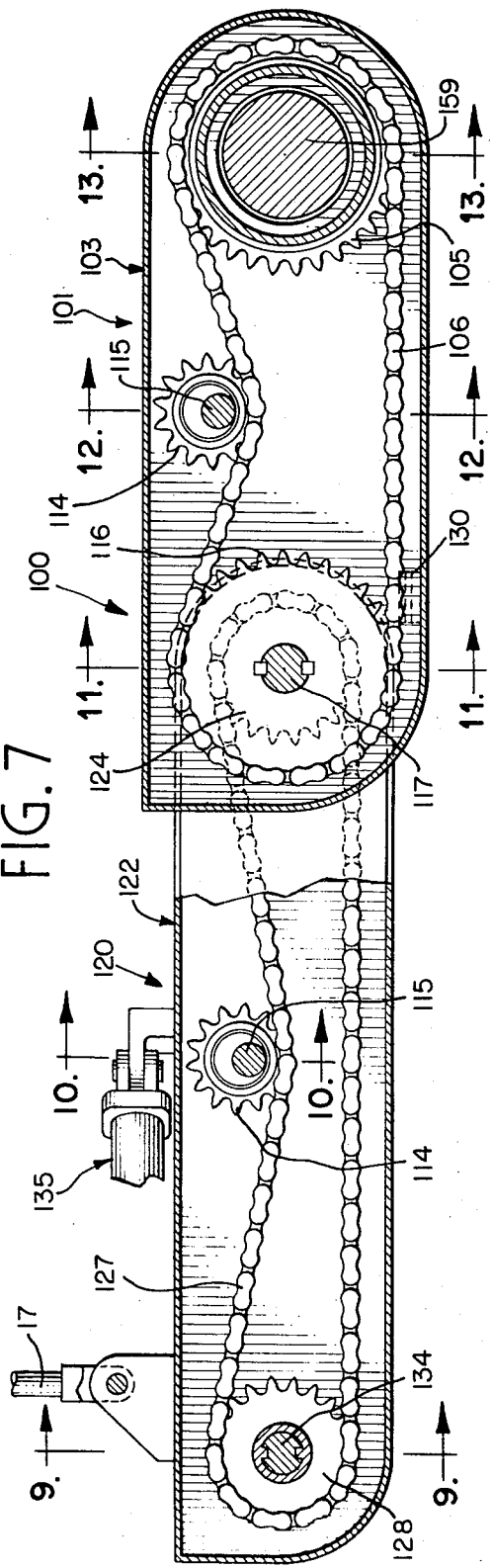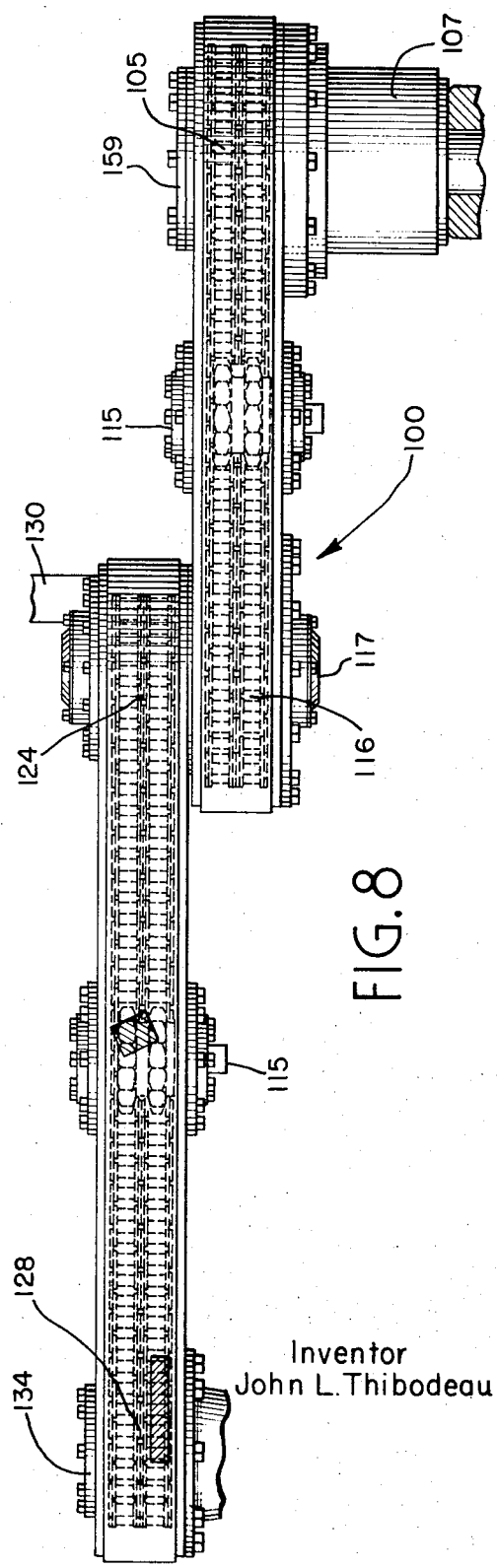
FIG. 7
FIG. 8
Inventor
John L. Thibodeau

Inventor
John L. Thibodeau

3,703,216

TRACTOR DRIVE CONVERSION

CROSS REFERENCES TO RELATED APPLICATIONS

This application is a division of Application Ser. No. 811,728, filed Apr. 1, 1969, and since issued as U.S. Pat. No. 3,620,321, for Tractor Drive Conversion.

FIELD OF THE INVENTION

This invention relates to land vehicles and more particularly to a tractor that is particularly adapted for movement over rough terrain and marshlands and which can form the basic power unit for a logging machine that is capable of sheering, delimbing, skidding, and bucking logs.

DESCRIPTION OF THE PRIOR ART

The present invention is an improvement over my U.S. Pat. No. 2,901,051, entitled "Tractor Drive and Suspension Mechanism." In the land vehicle field it has been the general practice to employ separate machines for sheering, delimbing, skidding, and bucking of logs. Heretofore tractors have been unsuitable as a power source for these machines in that considerable difficulty has been experienced in the movement of the tractor over rough terrain. In my prior patent above, I have attempted to provide a tractor conversion unit which enables a tractor to operate under adverse ground conditions. However, this conversion has proved unsatisfactory due to the high cost of conversion, the elaborate linkage system required, and the difficulty in steering and stability due to the rigid fastening of the wheels to the frame.

SUMMARY OF THE INVENTION

The general purpose of this invention is to provide a tractor conversion unit which embraces all the advantages of similarly employed devices and possesses none of the aforedescribed disadvantages. To attain this, the present invention contemplates a unique arrangement whereby a conventional farm tractor is modified so as to utilize the original power unit, transmission-differential as well as the original frame of the tractor. A walking beam frame assembly is attached to each side of the tractor. Each assembly houses a sprocket for a front wheel, a sprocket for a rear wheel, a sprocket to drive these wheels, and a chain to take the power from the drive sprocket and transfer it to the front and rear wheel sprockets. The drive sprocket is connected to the rear axle of the tractor transmission-differential on each side so that the power from the tractor is transmitted to a pivot sprocket and then transmitted to the front wheel sprockets by a continuous chain. At each wheel, a ball joint is added which is connected to the wheel sprocket on the frame and gets its power from the source. Attached to each ball joint is a hydraulic cylinder with a steering arm allowing each wheel to be steered hydraulically. In a first disclosed embodiment only the front wheels are steerable and in a second disclosed embodiment, all four wheels are steerable. Next, four large wheels with high flotation tires are added. At the front of the walking beam assembly on each side of the tractor there is attached a vertical hydraulic cylinder and connected to it is a yoke which extends over the hood of the tractor frame, allowing the power unit to be raised or lowered hydraulically without affecting the plane of the four wheels and acting as an oscillator on the front wheels.

Therefore an object of the present invention is to provide a kit which can be readily attached to any conventional tractor thereby converting it from a two wheel to a four wheel drive.

Another object is to provide a kit to convert a tractor into a "crawler."

A further object of the invention is the conversion of a tractor to allow for the change of the center of gravity of the unit horizontally by which the front axle can be loaded or unloaded.

Still another object is to provide a tractor conversion kit which can be as easily removed as installed thereby allowing the tractor to be returned to its original condition.

Yet another object of the present invention is the provision of a tractor which is capable of agricultural uses because of greatly increased traction, pulling and hauling ability and maneuverability with lesser horsepower requirements.

A still further object of the present invention is to provide a tractor which eliminates soil compaction and is low in cost to produce.

A further object of the invention is the provision of a tractor which can be driven over rough terrain and which permits one wheel to ride higher or lower than the other and still keeps the tractor level with all four wheels touching the ground.

Another and still further object is to provide a tractor in which there is a simple hand switch power steering control to permit a minimum turning radius and which will enable an operator to work continuously over rough and rugged terrain with a minimum of manual effort required in steering the tractor.

A still further object of this invention is to provide a tractor in which the original front wheels of the tractor may be lowered so as to operate as a conventional tractor unit.

Other objects and many of the attendant advantages of this invention will be readily appreciated as the same becomes better understood by reference to the following detailed description when considered in connection with the accompanying drawings in which reference numerals designate like parts throughout the figures thereof.

BRIEF DESCRIPTION OF THE DRAWINGS

FIGS. 2 and 3 show the beam assembly of FIG. 1 in a second and third position.

FIG. 4 illustrates the use of the original front tractor wheels in conjunction with the beam assembly.

FIG. 6 shows a top view of the tractor shown in FIG. 1 including the hydraulic steering system.

FIG. 7 is an exploded diagrammatic view of the split beam shown in FIG. 1.

FIG. 8 is a top view of the split beam shown in FIG. 7.

DESCRIPTION OF THE PREFERRED EMBODIMENTS

Figure 1:
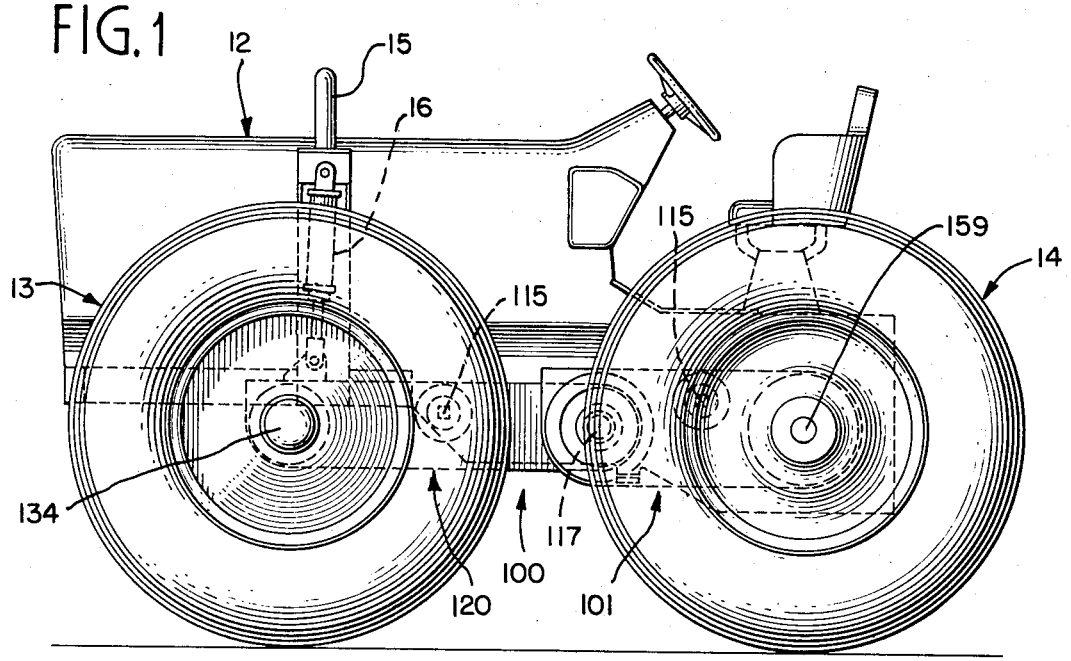
FIG. 1 shows a side view of a first preferred embodiment of the invention showing a two section beam assembly attached to a tractor.

Referring now to the drawings wherein like reference characters designate like or corresponding parts throughout the several views, there is shown in FIG. 1 which illustrates a first preferred embodiment, a conventional farm tractor body or frame 12 which has had its two large wheels at the rear and two small drive wheels at the front removed, thereby leaving the power unit, the body and the rear axle transmission-differential intact. A beam assembly 100 comprising two frame assemblies 101 and 120 is placed on either side of the tractor. Front beam assembly 120 contains a sprocket 128 for a front wheel having an axle 134. Rear beam assembly 101 is connected to rear drive axle 159 which is the original transmission axle of the tractor. The front sprockets receive their power from pivot drive sprockets 116 and 124 attached to pivot axle 117. The sprockets are connected together with drive chains 106 and 127 as shown in FIG. 7. The power from the tractor transmission causes rear sprocket 105 to rotate thereby causing pivot sprockets 116 and 124 to rotate and imparting motion to sprocket 128 through the continuous chains 106 and 127. At each front wheel, a ball joint is connected to the wheel sprocket and the frame. A hydraulic cylinder is attached to each ball joint with a steering arm and this allows each front wheel to be steered hydraulically (as explained below). Four large wheels 13 and 14 are added having high floatation tires. A vertical hydraulic cylinder 16 is connected to each end of a yoke 15 which extends over the hood of the tractor. This vertical cylinder allows the power unit to be raised or lowered hydraulically without affecting the plane of rotation of the four wheels and acts for oscillation of the front wheels.

Only a few simple hand tools are required to remove the original front and rear wheels of the tractor and install the beams and their accessories. No drilling, tapping, welding, or riveting is required and the tractor itself is never altered in any fashion. Conversely, the beams are as easily removed as installed, and the tractor can be returned to its original condition by reinstating the previously removed equipment. The sprocket and chain mechanism, as will be explained below, is always engaged to the original rear axle transmission-differential; and as long as this axle is turning, the four wheels are being driven regardless of the direction that the tractor is moving. There are no clutches to slip or wear out, and no gear trains that require constant maintenance and that occasional overhaul. Utilizing hydraulic steering of the wheels while the wheels are being driven through the chain drive, provides for no loss of traction in pulling a load regardless of any turning radius. The use of the hydraulic steering cylinders further provides positive steering at all times, eliminating the use of tie rods and kingpins and the adjustments that would go with them.

Figure 2:
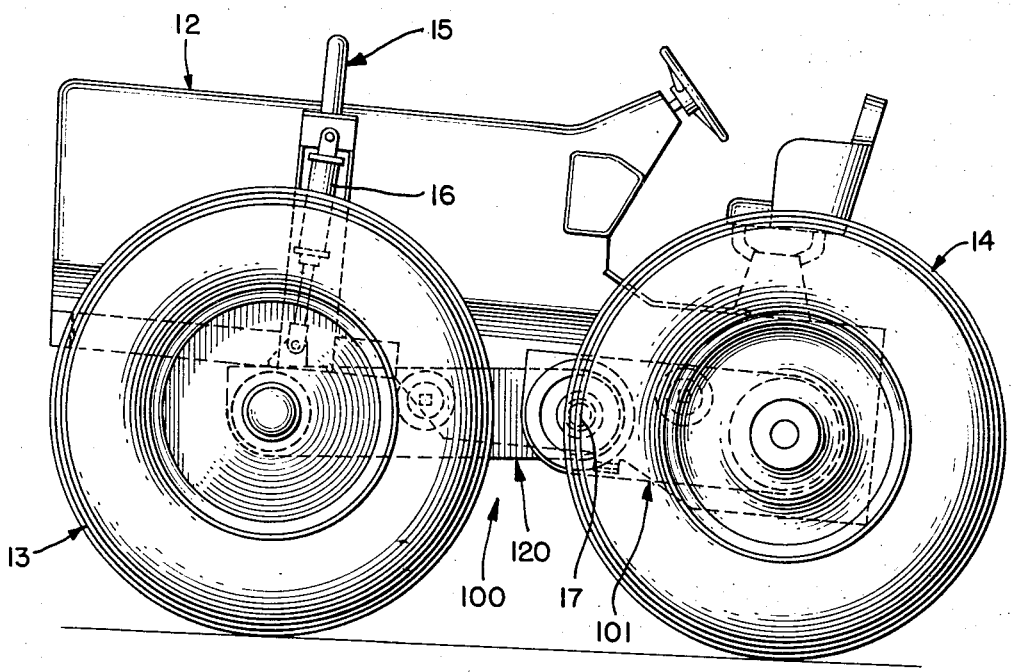

Vertical oscillating cylinders 16 permit the operator of the tractor to raise or lower the back end of the tractor with various equipment attached to it and thus change the center of gravity of the machine as shown in FIG. 2. This allows more weight to be placed on the rear axle for greater traction of the rear wheels. FIG. 3 shows an additional function of these cylinders. The cylinders keep both front wheels on the ground at all times. This hydraulic system is a closed balanced entity that permits one wheel to ride higher or lower than the other, by the action of the cylinder piston rod 17 being extended or depressed in the cylinder thereby enabling all four wheels to touch the ground. This is necessary to retain the traction required to obtain full benefit from the four wheel drive.

FIG. 4 illustrates the third function of the vertical oscillating cylinders. These cylinders raise the beam front assembly 120 up alongside the tractor body 12, thus raising both new front wheels 13 off the ground and allowing the operator to use the manufacturers original steering system and front wheels 30. The original tractor wheel mountings allow for adjusting the width of all four wheels and this feature has been maintained in this design. One tractor which allows for this adjustment is manufactured by the International Harvester Company.

Figure 5:
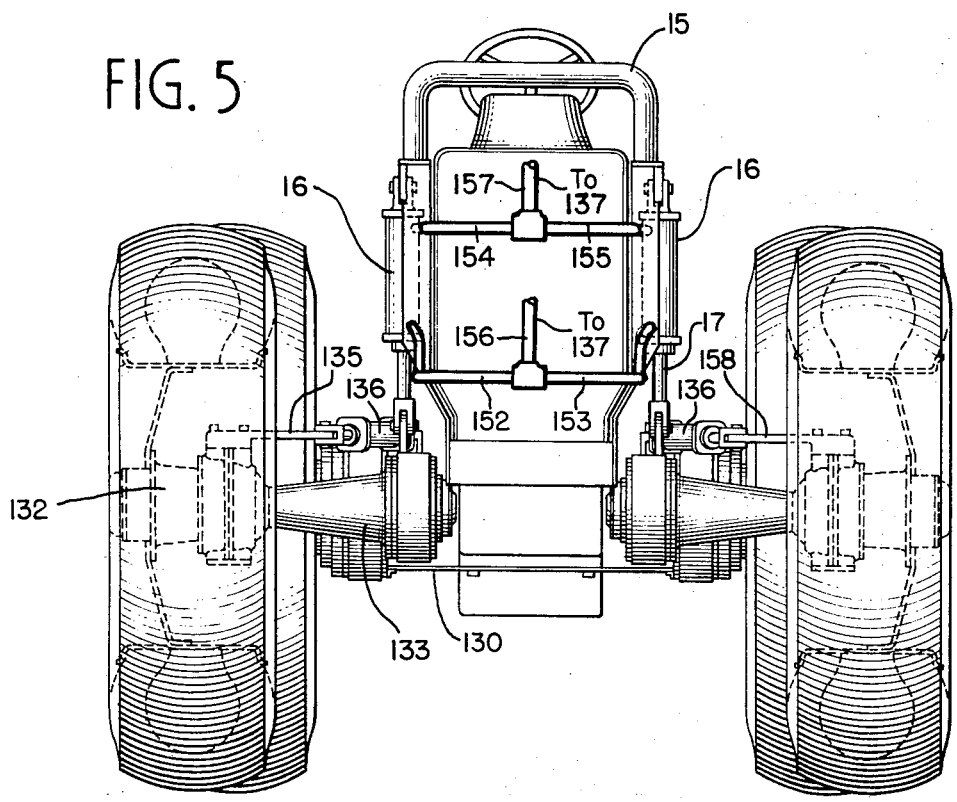
FIG. 5 shows a front elevation of the apparatus shown in FIG. 1, including the hydraulic fluid system for the vertical oscillators.

FIG. 5, showing a front view of the tractor, more clearly depicts the hydraulic front steering cylinders, 136, as well as the vertical oscillating cylinders 16.

FIG. 6, an overhead view of the tractor, shows the capability of hydraulic steering; as well as the hydraulic steering system, which will be more clearly explained below.

Figure 11:
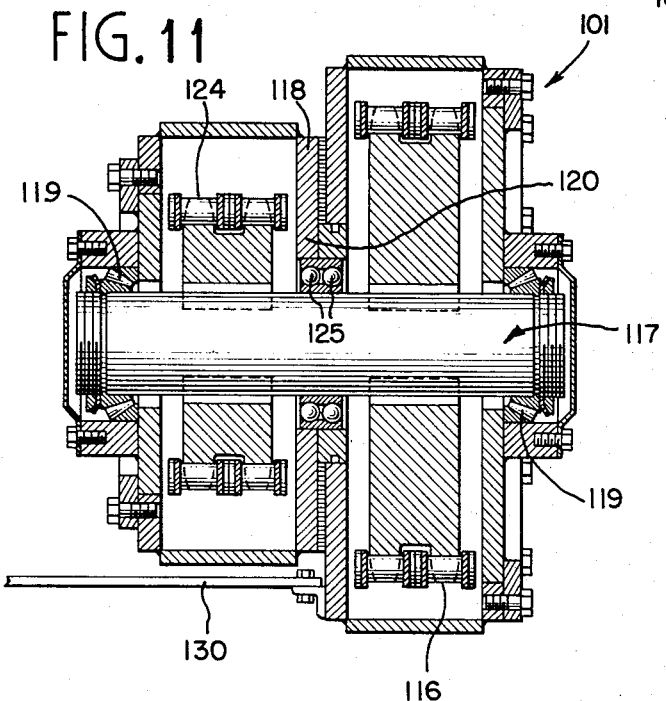
FIG. 11 shows an enlarged view of the pivot drive sprocket mechanism taken on the line 11—11 of FIG. 7 looking in the direction of the arrows.
Figure 12:
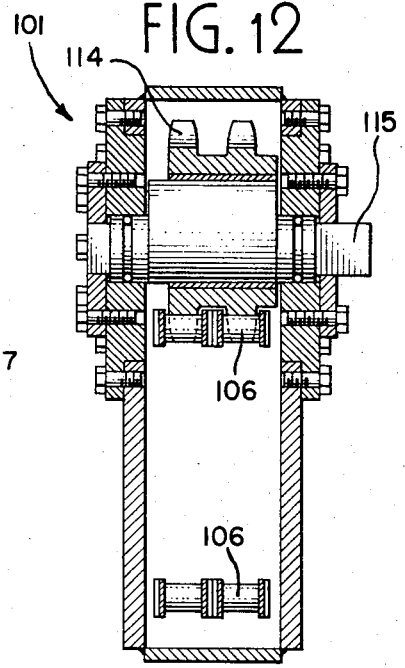
FIG. 12 shows an enlarged view of a second idler sprocket housing taken on the line 12—12 of FIG. 7 looking in the direction of the arrows.
Figure 13:
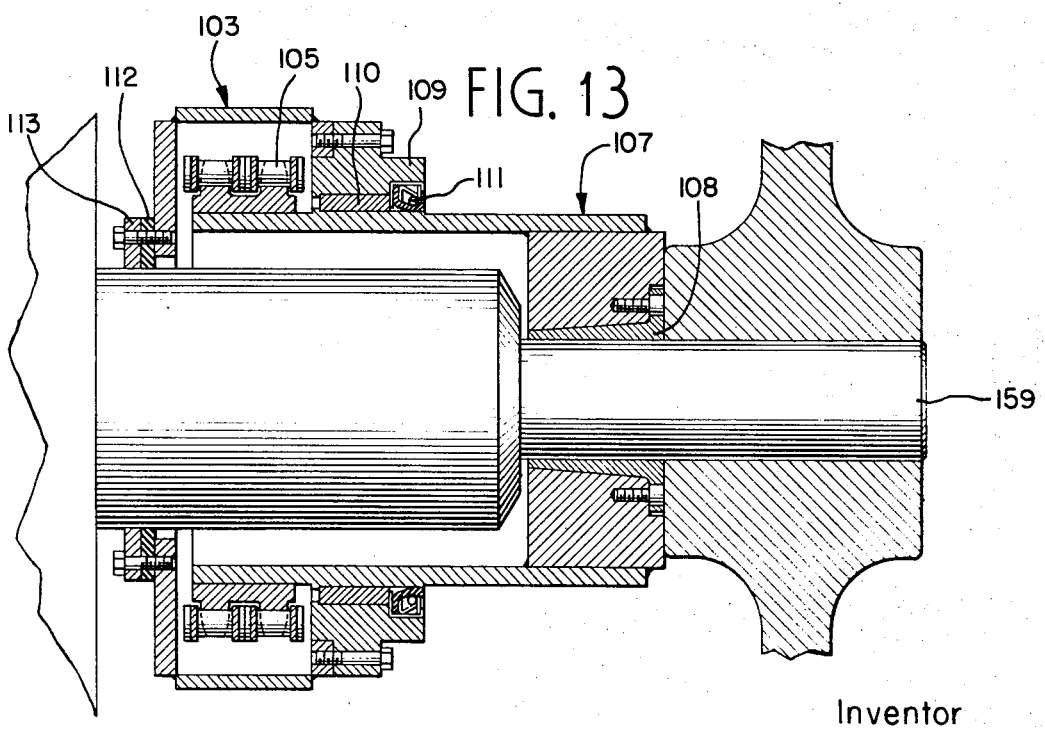
FIG. 13 illustrates the rear wheel housing unit taken on the line 13—13 of FIG. 7 looking in the direction of the arrows.

Referring now to FIG. 7 and FIG. 8 which more clearly illustrate the beam assembly 100 comprising a front section 120 and a rear section 101. The rear beam assembly 101 comprises a housing 103 containing a rear wheel drive sprocket 105, affixed to a rotating bell housing 107 that is connected to the transmission-differential of the tractor. Referring to FIG. 13, which shows the rear rotating bell housing 107 in detail, there is shown a bearing and seal housing 109, a tapered locking bushing 108, an oil seal 111, a leaded bronze bearing 110, and a gasket 112 connected to mounting plate 113. Returning now to FIG. 7, rear drive chain 106 is connected to rear wheel drive sprocket 105 and the pivot sprocket 116 which encircles the pivot shaft 117. FIG. 11 illustrates this connection in detail showing a first pivot sprocket 116 and a second pivot sprocket 124 adjacent to each other. Sprocket 124 is connected to the front wheel sprocket 128 by chain 127. Center sprockets 116 and 124 as shown in FIG. 11 form an integral unit which transmits the power from the rear transmission axle 159 to the front wheels, through continuous chains 106 and 127. Eccentric idler shaft 115 around which is sprocket 114 forms the last portion of rear beam assembly 101 and is used to maintain the tension in drive chain 106.

Front beam assembly 120 is very similar to the rear beam and comprises a housing 122, the pivot sprocket 124 referred to above, a front wheel sprocket 128 which is attached to front axle 134, as well as a second idler sprocket 114 and a second eccentric idler shaft 115. The front wheel sprocket is enclosed in the housing 132 shown in FIG. 9. A front steering cylinder 136 is attached to the front beam frame assembly as is a piston rod 17 which is part of vertical oscillating cylinder 16. Front drive chain 127 is then connected around front drive sprocket 128 and the pivot sprocket 124. A double row of ball bearings 125 is used to aid in rotation of the pivot unit (FIG. 11). Front driven sprocket 128 also has two ball bearings 129 shown in FIG. 9 to air in rotation.

Figure 9:
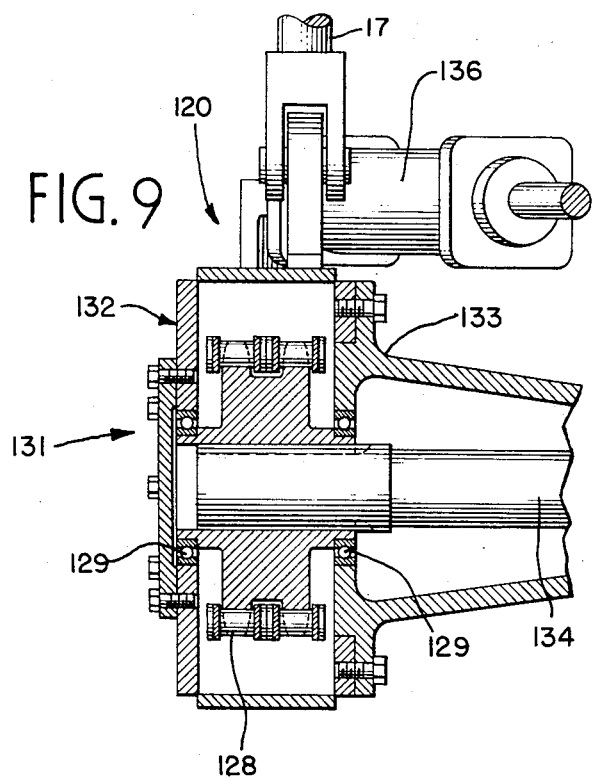
FIG. 9 is an enlarged view showing the front wheel rotating housing taken on the line 9—9 of FIG. 7 looking in the direction of the arrows.
Figure 10:
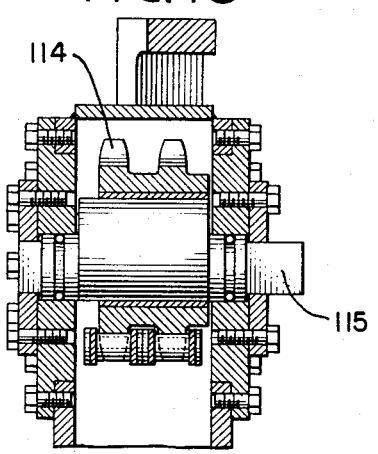
FIG. 10 illustrates an enlarged view of the idler sprocket housing taken on the line 10—10 of FIG. 7 looking in the direction of the arrows.

Referring now in more detail to the front end assembly, FIG. 9 shows the steering end assembly 131 consisting of the housing 132, a drive shaft housing 133, a drive shaft 134, and a steering arm 135. On the left side of the tractor there would be an equivalent steering arm 158 which corresponds to steering arm 135 on the right side and is identical except that it is a mirror image. The relative placement of the steering assembly is more clearly demonstrated with reference to FIGS. 5 and 6 which show housings 132 and 133 in the proper perspective with regard to the tractor body.

The hydraulic steering system is clearly shown in FIG. 6, and consists of hydraulic steering cylinders 136 and the accessories consisting of steering selector valve 137, hydraulic fluid tank 138, open port valve 139, and hydraulic hoses 140–147. The operation of this system will be more clearly explained below. The hydraulic system for oscillating cylinder 16 is shown in FIG. 5 and consists of the cylinders 16 and hydraulic hoses 152–157 which connect the hydraulic selection valve 137 shown in FIG. 6. The operation of the hydraulics is conventional and is merely controlled by opening and closing valve 137 to permit fluid to enter or leave the cylinders.

The operation of the front and rear beam assemblies will now be explained when considered in conjunction with FIGS. 5–13. To install the beam assemblies 100 to the tractor, the original rear wheels of the tractor are removed and the beam assemblies are placed along each side of the tractor body as in FIG. 6. The assemblies are fastened to the tractor frame 12 by utilizing mounting plates 113 of the rear beam housing 103 in conjunction with sealing gaskets 112 and tapered mounted bushings 108 which are tightly locked on the rear wheel transmission axles. The beam assemblies are then further secured to the tractor frame 12 by bolting the mounting bracket 130 to the beams and the underside of the tractor. The rear wheels are then remounted on the rear wheel transmission-differential axle 159.

The rotation of the transmission-differential axle 159 furnishes the drive power for the beam assemblies, the power being transmitted to the rear sprocket 105 through the tapered locking bushings 108, the rotation bell housings 107, and the drive sprockets 105 which are fixed to the bell housings. The row of chains 106 which are assembled on the sprockets, ride under the idler sprockets 114 which eliminates the slack in the chain and drive the driven sprockets 116. The driven sprockets 116 are fastened to and rotate the pivot shaft 117 thus turning the beam front assemblies driving sprockets 124 which are also fastened to the pivot shaft and transferring power into the forward half of the beam 120. The roller chains 127 ride under the idler sprockets and drive the driven sprockets 128 which in turn rotate the front wheels. The sprocket ratios of both front beam assemblies are 1:1 so that the front wheels turn the same number of revolutions as the rear wheels. This terminates the power transmission system.

The steering operation is controlled through the hydraulic steering cylinders 136 attached to the front assembly. With the front wheels set parallel to the center line of the tractor, the steering cylinder piston rods are set at half stroke and are attached to steering arms 135 and 158 of the steering end assembly 131. this can be clearly seen in FIG. 6. The steering selection valve 137 controls the flow of the hydraulic fluid to the steering cylinders and by extending or depressing the piston rods, the tractor will be directed left or right through the steering arms, turning the steering end assembly 131 through an arc of 25° on both sides of a neutral position.

For proper operations, hydraulic steering cylinders 136 must be bled to remove all of the air from the system and this is accomplished by opening the open port valve 139 in the hydraulic fluid tank 138. After making sure that it is immersed in the hydraulic fluid, and with the front wheels free of the ground oscillating them against the piston rods, extending and depressing the rods to their maximum, driving all the air out through the open port of the valve. The wheels are realigned parallel to the center of the tractor and the valve is closed. This system is now secured and operable. Steering selector valve 137 is also used to select between the original steering system as furnished on the tractor by the manufacturer, and the new steering system shown in FIG. 6. This valve is an integral part of both systems and with it the operator will be able to select either system as required for any particular application.

The last facet of this new conversion design is the dual capabilities associated with the oscillating cylinders 16 which are mounted on the front end of the tractor. These cylinders are normally set at half piston stroke and are also hydraulically operated. The primary purpose of these cylinders is to keep the two front wheels always in contact with the terrain over which the tractor is moving, within the limit of the stroke of the piston rod. The secondary purpose of these cylinders is to raise or lower the front or back of the tractor. The source of the hydraulic fluid necessary for operating the steering cylinder and oscillating cylinder systems described above comes from the hydraulic system that is furnished with the tractor. Activation of these cylinders is again controlled by selector valve 137.

While the beam assembly 100, having component parts 101 and 120, have been described singularly, it is to be understood that there is both a left-hand member and a right-hand member as shown in FIG 6. There are two front wheel steering assemblies, one of which is shown in FIG. 9, two front idler assemblies shown in FIG. 10, two center pivot sprockets shown in FIG. 11, two rear idler assemblies shown in FIG. 12, and two rear wheel drive sprocket assemblies shown in FIG. 13. By modifying the original tractor in this manner, a new and improved device is obtained which can serve as a singular logging machine which accomplishes shearing of the limbs, delimbing, skidding, and bucking all in one power unit. This is achieved because of the unique capabilities of four wheel drive and independent front suspension, which heretofore has not been present.

It will be recognized by one skilled in the art that while the preferred embodiment utilizes a hydraulic steering system and a hydraulic suspension system, any other type of power steering and/or suspension system may be utilized such as an air suspension system and/or an air steering system.

It should be further understood, of course, that the foregoing disclosure relates only to one preferred embodiment of the invention and that numerous modifications or alterations may be made therein without departing from the spirit and the scope of the invention as set forth in the appended claims.

What is claimed is:

1. A conversion unit for replacing the original rear wheels of a conventional two wheel drive tractor and for adding an additional pair of driven front wheels to said conventional two wheel drive tractor to convert said conventional two wheel drive tractor into an optional four wheel drive tractor and wherein said conventional tractor comprises a longitudinally extending body supporting a power unit connected to a single transmission differential axle unit having a drive assembly extending laterally on each side of said body for normally driving the original rear wheels of said conventional two wheel tractor, and an original pair of non-driven front wheels connected to said body, said conversion unit comprising:
   a rear beam assembly mounted on each side of said tractor body, each of said rear beam assemblies being mounted at a first end to said drive assembly;
   a front beam assembly mounted to each of said rear beam assemblies, each of said front beam assemblies being mounted by a pivotal mounting means at a first end to a second end of said rear beam assembly;
   a front wheel mounting means mounted to a second end of each of said front beam assemblies;
   a rear wheel mounting means mounted to said first end of each of said rear beam assemblies;
   a rear drive means in each of said rear beam assemblies, connected to said drive assembly, to said rear wheel mounting means, and to said pivotal mounting means for transmitting movement to said pivotal mounting means and to said rear wheel mounting means;
   a front drive means in each of said front beam assemblies, connected to said pivotal mounting means and to said front wheel assembly for transmitting movement thereto;
   means for connecting a wheel to each of said wheel mounting means to be driven therefrom and thereby converting said conventional tractor into a four wheel drive tractor; and
   a hydraulic suspension means connected between said front beam assembly and said tractor frame wherein said front beam assembly may be raised so as to render said driven front wheels inoperative and wherein said original non-driven front wheels become operative.

2. The conversion unit of claim 1 wherein said hydraulic suspension means comprises:
   a yoke-like rigid member fastened on either side of said tractor body; and
   hydraulic cylinder means fastened between said yoke-like member and each of said front beam assemblies thereby causing each of said driven front wheels to be independently suspended.

3. The conversion unit of claim 2 wherein said wheel connecting means further comprises a means for providing pivotal movement of each of said driven front wheels about a substantially vertical axis relative to said front beam assembly.

4. The conversion unit of claim 3 further comprising power steering means connected to said connecting means for each of said front wheels whereby said power steering means pivots said wheels about said vertical axis.

5. The conversion unit of claim 4 wherein said rear drive means and said front drive means each comprise a continuous chain.

6. The conversion unit of claim 5 further comprising an idler means mounted in each of said front and rear beam assemblies whereby said idler means is adapted to maintain tension in each of said drive means.

7. A conversion unit for use in combination with a conventional two-wheel drive tractor having a power unit, a transmission-differential drive axle and a tractor body, the improvement which comprises:
   two front beam assemblies, each disposed at a respective side at the front portion of said tractor body for movement relative thereto;
   two rear beam assemblies connected to said tractor body;
   a front wheel mounting means connected to each of said front beam assemblies;
   a rear wheel mounting means connected to each of said rear beam assemblies;
   a pivot means for connecting each said front beam assembly to a corresponding one of said rear beam assemblies;
   a rear drive means connected between said rear wheel mounting means, said transmission-differential drive axle and said pivot means for transmitting movement from said power unit to said rear wheel mounting means connected on each side of said tractor body and to said pivot means;
   a front drive means for transmitting movement from said pivot means to said front wheel mounting means;
   a hydraulic suspension means connected between said front beam frame assembly and said tractor body wherein said driven front wheel mounting means are independently suspended and wherein said driven front wheel mounting means may be raised so as to render them inoperable; and
   a steering means connected to said driven front wheel mounting means.

8. The conversion unit of claim 7 wherein said hydraulic suspension means comprises:
   a yoke-like rigid member fastened on either side of said tractor body; and
   hydraulic cylinder means fastened between said yoke-like member and each of said front beam assemblies 9. The conversion unit of claim 8 wherein each of said front and rear drive means comprise continuous chains.

10. The conversion unit of claim 9 wherein said front wheel steering means is hydraulic.

* * * * *